United States Patent [19]

Fisher

[11] Patent Number: 5,088,516

[45] Date of Patent: Feb. 18, 1992

[54] TEMPERATURE COMPENSATOR FOR PRESSURE REGULATOR

[75] Inventor: John M. Fisher, Cuyahoga Falls, Ohio

[73] Assignee: The B. F. Goodrich Company, Akron, Ohio

[21] Appl. No.: 690,413

[22] Filed: Apr. 23, 1991

[51] Int. Cl.⁵ .............................................. F16K 17/38
[52] U.S. Cl. ........................................ 137/80; 137/468; 137/505.18; 236/92 R
[58] Field of Search .................. 137/505.14, 505.18, 137/468, 80; 236/92 R

[56] References Cited

U.S. PATENT DOCUMENTS

| | | | |
|---|---|---|---|
| 1,219,516 | 3/1917 | Whittelsey | 137/468 |
| 2,371,122 | 3/1945 | Armstrong | 137/468 |
| 3,709,044 | 1/1973 | Chacko | 251/74 |
| 3,818,921 | 6/1974 | Peczkowski | 137/505.18 |
| 4,513,881 | 4/1985 | Heimovics, Jr. | 137/468 |
| 4,606,497 | 8/1986 | Heimovics, Jr. | 236/92 R |
| 4,790,343 | 12/1988 | Mochizuki | 137/80 |
| 5,009,249 | 4/1991 | Fisher et al. | 137/505.18 |

Primary Examiner—A. Michael Chambers
Attorney, Agent, or Firm—Joseph Januszkiewicz

[57] ABSTRACT

A temperature compensator for use on a gas pressure regulator which inflates an infatable aircraft slide. The temperature compensator is cooperative with a movable valve upon actuation, to control the flow of pressurized fluid past a discharge orifice. The temperature compensator has a plurality of nested tubes that have alternate ones of a different linear coefficient of thermal expansion to provide an expansion and contraction of the overall length of the tubes to effect an adjustment of the movable valve and its corresponding control of the opening of the discharge orifice.

7 Claims, 2 Drawing Sheets

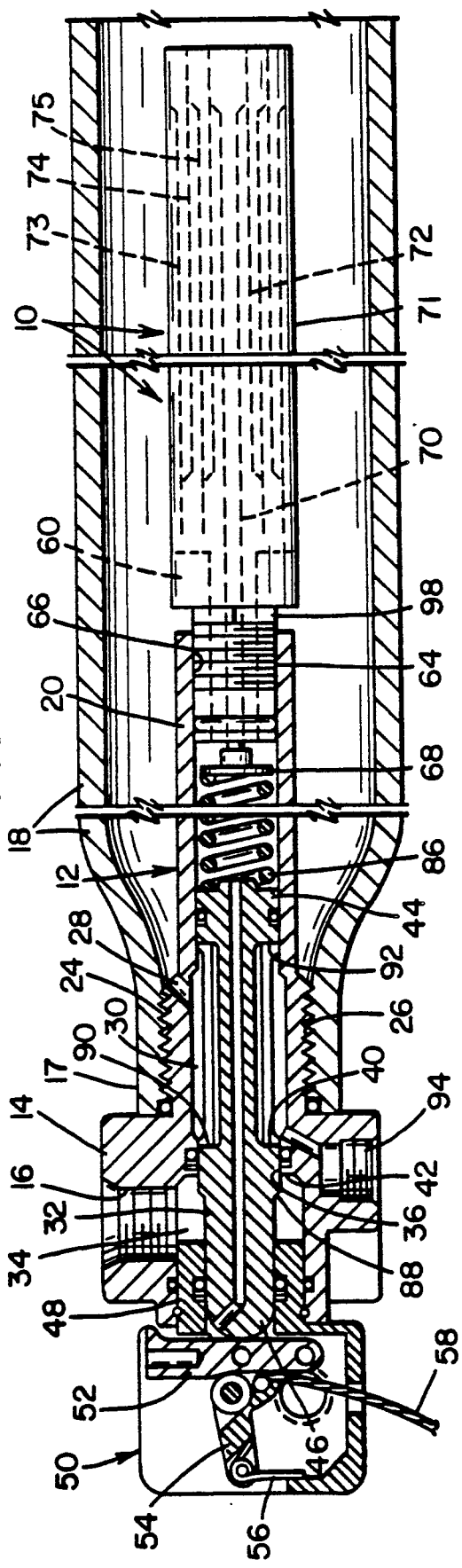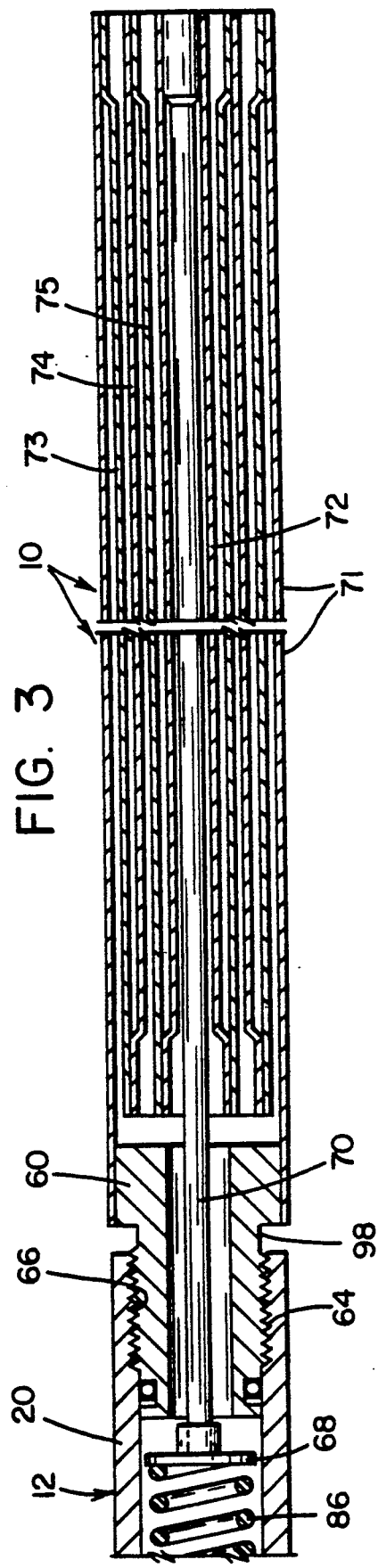

TEMPERATURE COMPENSATOR FOR PRESSURE REGULATOR

BACKGROUND OF THE INVENTION

This invention relates to fluid pressure regulators for use in inflation systems for inflatable escape slides and other inflatables where the output pressure of the gas supply decreases during the inflation process. This control of the increase in pressure is especially necessary and advantageous in systems where the gas under pressure is supplied to an aspirator and counteracts the increase in backpressure due to the inflation of the slide or other inflatables. If the regulator is set for optimum operation at room temperature, it does not operate satisfactorily or efficiently at low temperatures in the range of $-40°$ F. ($-40°$ C.). Therefore, it has been the practice to set the regulator for a compromise temperature which reduces the efficiency of the system at lower temperatures. The reduction in efficiency has resulted in an excessively high output pressure of the gas flow using up an excessive amount of gas and requiring a larger bottle of gas. Also the time required to deploy the inflatable has been excessive at moderate temperatures.

Another way to optimize the operation of the fluid pressure regulator is to attach a temperature compensator containing a fluid to the regulator whereby the fluid is expandable and contractible in response to increase or reduction of temperature of the gas, thereby optimizing the operation of the regulator. However, such a regulator is susceptible to loss of fluid, reducing the effectiveness of the temperature compensator and the operation.

A further way to adjust pressure has been to use a temperature compensator having an internal rubber plug which by expanding or contracting due to temperature changes, controls the pressure output of the regulator valve. However, in this instance the rubber plug suffers from the fact that it is compressible and subject to "creep" under load over a time period. This condition shows up as requiring an extended deployment time for the escape slides, which condition is unacceptable to the customer and to the safety of the passengers who are to use the slides in the case of an emergency. It is an object of the present invention to use a bimetallic device as a temperature compensator which utilizes the different rate of thermal expansion of the two different metals to adjust the position of the regulator valve. A further feature of the present invention is to provide several tubes of different diameters nested in parallel relationship to give the equivalent of a single tube assembly within one-third of the actual effective length that would be required in this instance.

SUMMARY OF THE INVENTION

The temperature compensator of the present invention is mounted on a fluid pressure regulator and is responsive to changes in temperature of the gas in the high pressure fluid container so that the regulator can be set for optimum operation at moderate temperatures and at the same time provide satisfactory regulation at substantially lower temperatures. In this way the regulator with the temperature compensator has appreciably decreased the deployment time and provided the required gas flow with a reduced size high pressure container that has a nested set of bimetallic tubes.

In accordance with one aspect of the invention there is provided a temperature compensator for a gas pressure regulator having a valve member movable to open a pressurized gas discharge orifice comprising temperature sensitive adjusting means for adjusting the amount of valve member opening movement in response to increases and reductions in temperature providing smaller orifice openings at lower temperatures and larger orifice openings at higher temperatures to maintain an optimum flow of gas to an aspirator for filing inflatables with a gas and air mixture under pressure.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

FIG. 1 is an axial cross section of a fluid pressure regulator in the closed condition mounted on a high pressure gas bottle showing the temperature compensator of this invention mounted on the regulator with parts being broken away.

FIG. 3 is an enlarged fragmentary sectional view of a portion of the regulator and the temperature compensator which is mounted on the regulator.

DETAILED DESCRIPTION

Figure 2:
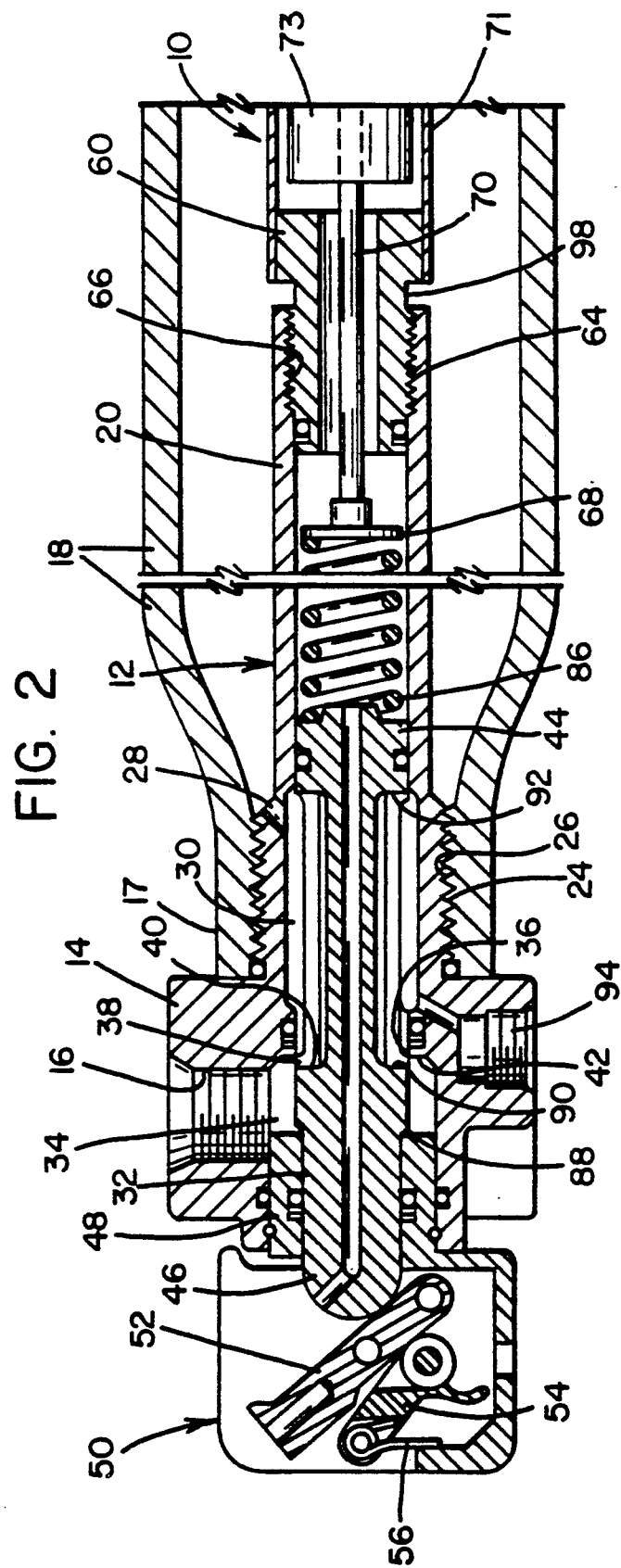
FIG. 2 is an enlarged fragmentary sectional view of the regulator as depicted by FIG. 1 but showing the regulator in the open condition.

Referring to FIGS. 1 and 3, a temperature compensator 10 is shown mounted on a gas pressure regulator 12 which has a manifold 14 with a port 16 in communication with an aspirator (not shown) for inflating an escape slide or other inflatable (not shown). The gas pressure regulator 12 is mounted in neck 17 of a high pressure gas bottle 18 and regulates the flow of high pressure gas from the bottle through the port 16 to the aspirator and escape slide. This regulation is desirable to control the output pressure of the gas flow as the pressure of the gas in the bottle 18 decreases during the inflation process.

The regulator 12 is shown in the closed condition in FIG. 1 and in the open condition in FIG. 2. The regulator 12 has a supporting member such as tubular body 20 extending outwardly from the manifold 14 through the neck 17 of the bottle 18. The tubular body 20 may have threads 24 at the outer periphery for threaded engagement with a threaded portion 26 in the neck 17 of the bottle 18. A port 28 in the tubular body 20 provides communication from the space within the bottle 18 to a high pressure chamber 30 within the tubular body. A valve member 32 is slidably mounted in the tubular body 20 and extends into a low pressure chamber 34 in the manifold 14.

The valve member 32 is slidably mounted in a cylindrical opening 36 in the manifold 14 for closing the opening, as shown in FIG. 1, and providing an orifice 38 between an edge 40 of the valve member 32 and an edge 42 of the opening in the manifold. This orifice 38 provides communication between the high pressure chamber 30 and low pressure chamber 34 which is in communication with the port 16. The valve member 32 also has a boss 44 at one end in slidable engagement with the inner surface of the tubular body 20 and spaced from the edge 40 to form the high pressure chamber 30.

At the other end, the valve member 32 has an actuating plunger 46 which is slidably mounted in a sleeve 48 of an actuating assembly 50 mounted on the manifold 14. The actuating assembly 50 may have a lever 52 pivotally mounted for swinging movement toward and away from the actuating plunger 46. A latch 54 is also pivotally mounted in the actuating assembly 50 for engagement with the lever 52 and is held in position by a spring 56 as shown in FIG. 1. A lanyard 58 is connected to the latch 54 for pulling the latch downward to release the lever 52 and permit movement of the valve member 32 to the left as shown in FIG. 2.

As shown in FIG. 3, the temperature compensator 10 has an outer sleeve 60 with threads 64 in threaded engagement with threads 66 on the inner periphery of the end portion of tubular member 20 for adjustably moving the sleeve 60 toward and away from the valve member 32. A flange or piston head 68 is suitably fastened to one end of a rod or piston rod 70. Interconnecting the piston rod 70 and the sleeve 60 are a plurality of nested tubes or nested tubular members consisting of an outermost tube or tubular member 71, an innermost tube or tubular member 72 and tubular members 73-74-75. The respective one ends of the nested tubes 71 through 75 are the ones remote from the valve member 32 while the other ends of the tubular members 71 through 75 are the ones closest to the valve member 32. The one end of the outermost tube 71 is connected to the one end of the next adjacent inner tubular member 73 while the other end of tubular member 73 is connected to the other end of the next adjacent inner tubular member 74. The one end of the tubular member 74 is connected to the one end of the next adjacent tubular member 75 which tubular member 75 has its other end connected to the other end of the innermost tubular member 72 to define a plurality of nested tubes that are telescopic in nature in response to temperature changes as to be described. Alternate tubular members 71-74-72 are made from a low linear expansion metal such as steel in comparison to remaining alternate tubular members 73-75 which are made from a high linear expansion metal such as aluminum. The coefficient of expansion of steel is 0.00000633 of an inch per degree Fahrenheit whereas the coefficient of expansion of aluminum is 0.00001244 of an inch per degree Fahrenheit. Thus with the use of the different rates of thermal expansion of the different metals in the nested tubes as described, there is provided a linear telescopic expansion of the nested tubes to adjust the position of the valve member 32 in response to the change in temperature which in turn moves the valve member 32 in a manner to be described to maintain an optimum flow of gas to an aspirator for filling inflatables with a gas and air mixture under pressure.

A resilient means such as a coil spring 86 is positioned between the boss 44 of the valve member 32 and the flange 68. In the position shown in FIG. 1, the coil spring 86 is in compression so that when the actuating assembly 50 is triggered by pulling the lanyard 58 causing the latch 54 to swing downwardly, the valve member 32 will be urged to the left as shown in FIG. 2. The lever 52 may then swing away from the valve member 32 and permit movement of the valve member to the position shown in FIG. 2 opening the orifice 38. This permits passage of the gas from the bottle 18 through the port 28 into the high pressure chamber 30 and then through the orifice into the low pressure chamber 34.

In the low pressure chamber 34, the valve member 32 has a radially extending surface or first effective end area 88 positioned to provide a force for urging the valve member 32 in a direction to close the orifice 38. In the high pressure chamber 30, the valve member 32 has a radially extending surface at either end providing a second effective end area 90 and a third effective end area 92 positioned to provide forces in opposite directions operating on the valve member 32. The size of the effective end areas 88, 90 and 92 are selected so that the forces produced by the gas pressure in the low pressure chamber 34 and high pressure chamber 30 will balance the force of the spring 86 and provide a desired size of the orifice 38.

The operation of the temperature compensator 10 was briefly described above and in viewing FIG. 2 it is to be noted that as the temperature drops the movement of the piston 68 is to the right as viewed in FIG. 3 since the nested tubes contract and move such piston 68 to the right to thereby reduce the force exerted on the valve member 32 by the spring 86. This adjustment limits the movement of the valve member 32 to the left as viewed in FIG. 2 reducing the size of the orifice 38 so that the gas pressure in the low pressure chamber 34 at the beginning of the inflation procedure is decreased. At the reduced regulator pressure, the aspirator operates with greater efficiency as it fills the inflatable escape slide with a mixture of air and gas from the bottle 18.

As the gas pressure in the bottle 18 decreases, the valve member 32 will be moved to the left increasing the pressure in the low pressure chamber 34 and counteracting the backpressure in the escape slide. This provides a greater efficiency in the use of the pressurized gas contained in the bottle 18 which may be carbon dioxide or nitrogen or a mixture of the two. The gas pressure may be around 3,000 pounds per square inch (211 kilograms per square centimeter) and a suitable mixture may be from 30% carbon dioxide and 70% nitrogen to 85% carbon dioxide and 15% nitrogen. The bottle 18 may be recharged by injecting a suitable mixture of gas through a charge fitting port 94 in the manifold 14 which is suitable for receiving a special charge fitting (not shown).

To provide the desired initial compression of the spring 86, the sleeve 60 may be screwed into the tubular body 20 a desired distance. The sleeve 60 is provided with a substantially hexagonal portion 98 so that a wrench may be applied to turn the sleeve and adjust the position relative to the tubular body 20.

With the temperature compensator 10 described and shown the piston 68 is moved toward the valve member 32 by expansion of the nested tubular members in the outermost tubular member 71 upon an increase in temperature which will compensate for the higher pressure of the gas in the bottle 18. Conversely when the temperature of the gas in the bottle 18 decreases, the nested tubular members in the outermost tubular member 71 will contract permitting the piston rod 70 to move away from the valve member 32 and reduce the compression force of the spring 86. This will decrease the regulator pressure in the low pressure chamber 34 at the beginning of the inflation procedure.

By using the combination of nested tubes of aluminum and steel, the effective length of the compensator can be reduced to a practical length for use in a pressure storage bottle or container 18 that can easily be installed on an aircraft. For a temperature change of 100° F. the compensator provides a length change of 0.040 inches which translates to a pressure reduction of 100 psig.

While a certain representative embodiment and details have been shown for the purpose of illustrating the invention, it will be apparent to those skilled in the art that various changes and modifications other than those referred to may be made therein without departing from the spirit or scope of the invention.

I claim:

1. A temperature compensator for a gas pressure regulator, said gas pressure regulator having a discharge orifice, said gas pressure regulator having a valve member movable to open said gas discharge orifice, said valve member having at least a first effective end area exposed to gas under pressure in said regulator and positioned to provide a force for urging said valve member in a direction to close said orifice and a second effective end area exposed to gas under pressure and positioned to provide a force for urging said valve member in a direction to open said orifice, a resilient means providing a force for urging said valve member in a direction to open said orifice, a sleeve adjustably secured to said gas pressure regulator, at least three or more nested tubes in telescopic arrangement, said nested tubes having an outer tubular member and an inner tubular member, said outer tubular member having one end connected to said sleeve, a piston secured to said inner tubular member, said nested tubes having adjacent ones of said tubes with different coefficients of thermal expansion to provide an expansion and contraction in linear length of said nested tubes upon a change in temperature resulting in a linear movement of said piston in response to an increase or reduction of temperature, and said piston being engageable with said resilient means to vary the amount of force provided by said resilient means in response to said increases and reductions in temperature.

2. A temperature compensator for a gas pressure regulator, said pressure regulator having a housing with a discharge orifice for use in inflating an inflatable member; said housing having a valve member movable therein to variably open said discharge orifice; said valve member having at least a first effective end area exposed to gas under pressure in said regulator and positioned to provide a force for urging said valve member in a direction to close said orifice and a second effective end area exposed to gas under pressure and positioned to provide a force for urging said valve member in a direction to open said orifice; a resilient means providing a force for urging said valve member in a direction to open said orifice; a sleeve adjustably secured to said housing, a pluarality of nested tubes, said nested tubes having an outermost tube, an innermost tube, and at least a pair of intermediate tubes; said intermediate tubes located between said outermost tube and said innermost tube; the one end of all of said tubes are remote from said valve member; the other end of said tubes are closer to said valve member than said one ends; the other end of said outermost tube is connected to said sleeve; the one end of said innermost tube is connected to said piston; starting with said outermost tube alternate pairs of tubes have their one ends secured together; starting with the tube adjacent to said outermost tube alternate pairs of tubes have their other ends secured together to thereby define a telescopic relationship of said nested tubes; said tubes of said nested tubes have different linear coefficient of thermal expansion than an adjacent tube to provide an expansion and a contraction in linear length of said nested tubes resulting from an increase or reduction of temperature; and said piston being engageable with said resilient means to vary the amount of force provided by said resilient means in response to said increases and reduction in temperature.

3. A temperature compensator for a gas pressure regulator, said pressure regulator mounted in a housing with a discharge orifice for use in inflating an inflatable member, said regulator having a valve member movable therein to control the opening of said discharge orifice, said valve member having at least a first effective end area exposed to gas under pressure in said regulator and positioned to provide a force for urging said valve member in a direction to close said orifice and a second effective end area exposed to gas under pressure and positioned to provide a force for urging said valve member in a direction to open said orifice; a resilient means in said regulator having one end abutting said valve member and providing a force for urging said valve member in a direction to open said orifice; a flange member abutting the other end of said resilient means, a sleeve adjustably secured to said regulator, at least three or more nested tubes, the outermost one of said nested tubes connected to said sleeve, the innermost one of said nested tubes connected to said flange, the remaining ones of said nested tubes interconnected to each other and to said innermost and said outermost tubes in alternate telescopic relationship to define a telescopic arrangement, alternate ones of said nested tubes have different linear coefficient of thermal expansion to provide an expansion and contraction in linear length thereof resulting from an increase or reduction of temperature so that said resilient means via said flange varies the amount of force provided by said resilient means in response to changes in temperature.

4. A temperature compensator as set forth in claim 3 wherein certain ones of said nested tubes are aluminum and the remaining ones of said nested tubes are steel to thereby provide a steel tube nested between aluminum tubes which provides said different linear coefficient of thermal expansion for said alternate tubes.

5. A temperature compensator as set forth in claim 3 wherein said nested tubes provide a length that is approximately one-third the actual effective length of said nested tubes if placed end to end.

6. A temperature compensator as set forth in claim 3 wherein certain ones of said nested tubes have a low linear coefficient of thermal expansion and the remaining ones of said nested tubes have a high coefficient of thermal expansion.

7. A temperature compensator as set forth in claim 6 wherein all of said nested tubes are rigid.

* * * * *